United States Patent
Weber et al.

(10) Patent No.: US 8,158,904 B2
(45) Date of Patent: Apr. 17, 2012

(54) METHOD AND APPARATUS FOR FORMING A FEATURE IN A WORKPIECE BY LASER ABLATION WITH A LASER BEAM HAVING AN ADJUSTABLE INTENSITY PROFILE TO REDISTRIBUTE THE ENERGY DENSITY IMPINGING ON THE WORKPIECE

(75) Inventors: Jan Weber, Maple Grove, MN (US); Thomas J. Holman, Princeton, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1648 days.

(21) Appl. No.: 10/918,841

(22) Filed: Aug. 13, 2004

(65) Prior Publication Data

US 2006/0033240 A1      Feb. 16, 2006

(51) Int. Cl.
B23K 26/38      (2006.01)
B23K 26/06      (2006.01)

(52) U.S. Cl. .......... 219/121.71; 219/121.72; 219/121.73

(58) Field of Classification Search ............. 219/121.67, 219/121.71, 121.72, 121.73, 121.75; 264/400
See application file for complete search history.

(56) References Cited

U.S. PATENT DOCUMENTS

| | | | | |
|---|---|---|---|---|
| 4,755,176 A | | 7/1988 | Patel | 604/280 |
| 5,037,403 A | | 8/1991 | Garcia | 604/280 |
| 5,344,412 A | * | 9/1994 | Wendell et al. | 219/121.71 |
| 5,438,441 A | | 8/1995 | Rockstroh et al. | 359/15 |
| 5,478,426 A | | 12/1995 | Wiler et al. | 156/272.8 |
| 5,539,175 A | * | 7/1996 | Smith et al. | 219/121.7 |
| 5,733,301 A | | 3/1998 | Forman | 606/192 |
| 5,826,588 A | | 10/1998 | Forman | 128/898 |
| 6,165,152 A | | 12/2000 | Becker et al. | 604/96.01 |
| 6,177,648 B1 | | 1/2001 | Lawson et al. | 219/121.62 |
| 6,331,177 B1 | * | 12/2001 | Munnerlyn et al. | 219/121.69 |
| 6,375,774 B1 | | 4/2002 | Lunn et al. | 156/158 |
| 6,537,480 B1 | * | 3/2003 | Becker et al. | 219/121.71 |
| 6,618,174 B2 | * | 9/2003 | Parker et al. | 219/121.7 |
| 6,696,667 B1 | * | 2/2004 | Flanagan | 219/121.72 |
| 7,128,737 B1 | * | 10/2006 | Goder et al. | 606/10 |
| 2001/0027310 A1 | | 10/2001 | Parisi et al. | 604/524 |

(Continued)

FOREIGN PATENT DOCUMENTS

| | | | |
|---|---|---|---|
| JP | 7-241690 A | * | 9/1995 |
| JP | 8-108287 A | * | 4/1996 |
| WO | WO-99/20429 A1 | * | 4/1999 |
| WO | WO-03/002325 A2 | * | 1/2003 |

OTHER PUBLICATIONS

Lippert, T.; Hauer, H.; Phipps, C.R.; Wokaun, A., "Fundamentals and applications of polymers designed for laser ablation". Appl. Phys. A. vol. 77, May 2003, pp. 259-264.

(Continued)

*Primary Examiner* — Geoffrey S Evans
(74) *Attorney, Agent, or Firm* — Seager, Tufte & Wickhem, LLC

(57) ABSTRACT

A method and apparatus is provided for removing material from an outer surface of a workpiece such as a catheter or other medical device. The method begins by generating a laser beam having an intensity profile and directing the laser beam onto the outer surface of the workpiece. After the laser beam is generated, its intensity profile is adjusted by a component such as a diffractive optical element (DOE) or a holographic optical element (HOE) so that material can be removed from the workpiece by ablation in a prescribed manner.

36 Claims, 4 Drawing Sheets

U.S. PATENT DOCUMENTS

| | | | |
|---|---|---|---|
| 2002/0039209 A1 | 4/2002 | Parker et al. | 359/15 |
| 2003/0078613 A1 | 4/2003 | Heidner | 606/194 |
| 2003/0120257 A1 | 6/2003 | Houston et al. | 604/523 |
| 2003/0141002 A1 | 7/2003 | Flanagan | 156/64 |
| 2003/0179452 A1 | 9/2003 | Lizotte | 359/566 |
| 2004/0254562 A1* | 12/2004 | Tanghoj et al. | 604/523 |
| 2005/0233025 A1* | 10/2005 | Zhang et al. | 425/526 |

OTHER PUBLICATIONS

Golub, Michael; Grossinger, Israel. "Diffractive optical elements for biomedical applications". [Conference Paper] Proceedings of SPIE, The International Society for Optical Engineering. vol. 3199, Dec. 1997, pp. 220-231.

* cited by examiner

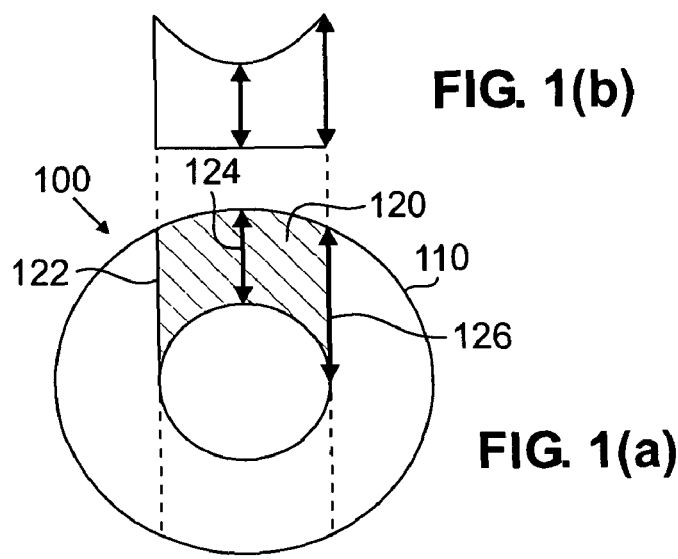
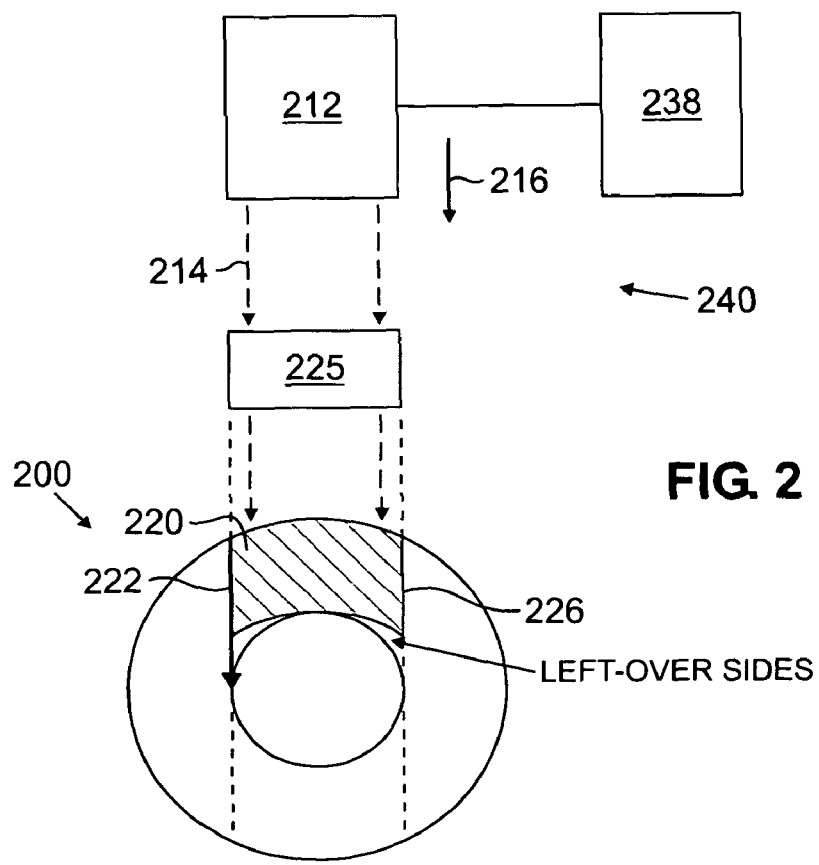

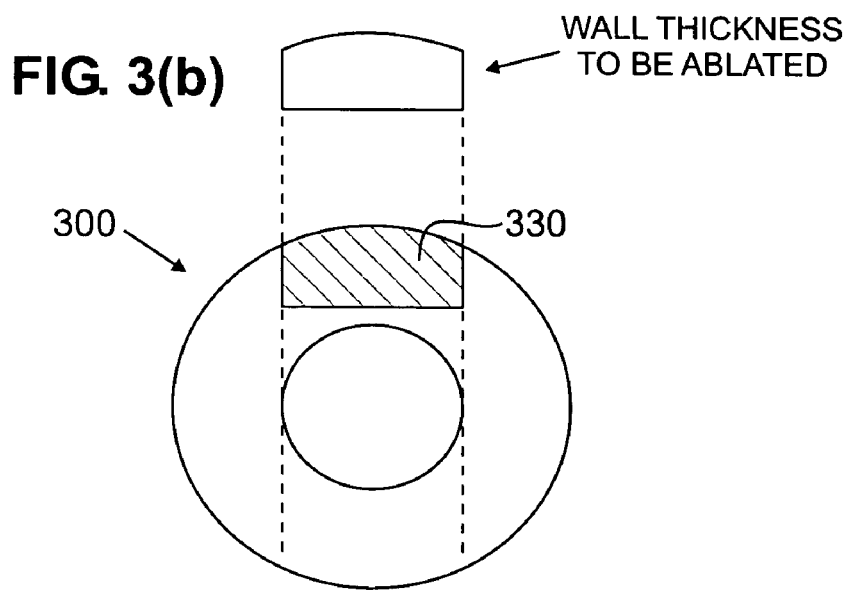
FIG. 3(a)
FIG. 3(b)
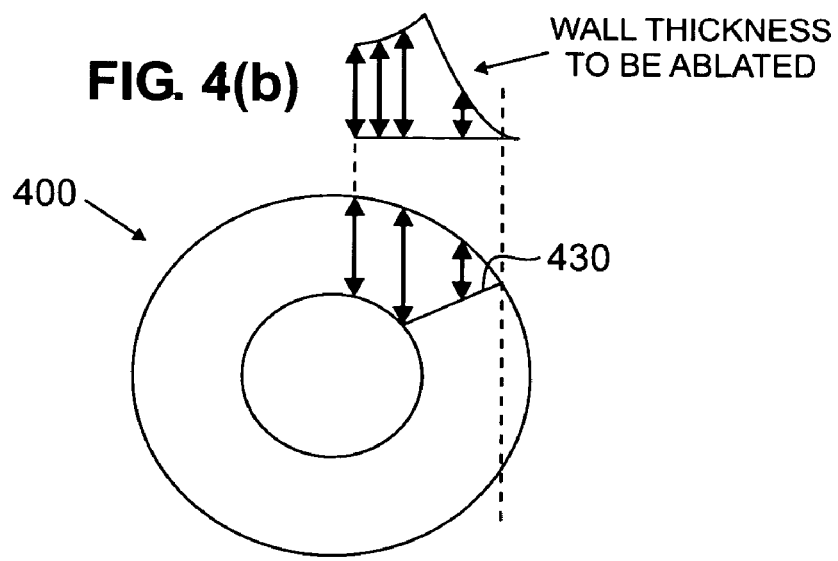
FIG. 4(a)
FIG. 4(b)

METHOD AND APPARATUS FOR FORMING A FEATURE IN A WORKPIECE BY LASER ABLATION WITH A LASER BEAM HAVING AN ADJUSTABLE INTENSITY PROFILE TO REDISTRIBUTE THE ENERGY DENSITY IMPINGING ON THE WORKPIECE

RELATED APPLICATIONS

This application is related to U.S. patent application Ser. No. 10/883,868 entitled "USE OF A DYNAMIC HOLOGRAPHIC OPTICAL ELEMENT IN LASER WELDING" filed in the United States Patent and Trademark Office on Jul. 2, 2004 the contents of which is incorporated by reference in its entirety.

FIELD OF THE INVENTION

The present invention relates generally to laser ablation of a workpiece, and more particularly to laser ablation of a polymeric workpiece such as a catheter that is employed in a medical procedure.

BACKGROUND OF THE INVENTION

Many types of catheters have been developed for treating problems and diseases of body systems including the vascular, pulmonary, lymphatic, urinary, and other systems that include one or more body lumens. Such catheters advantageously provide treatment by generally non-invasive techniques by permitting manipulation of distal features of such catheters from their proximal ends. These catheters may be made up of many components with properties selectively chosen for specific functions. And as a result, it is generally desirable to combine different components to obtain particular control aspects of such catheters. Generally, polymeric materials are used for such catheters because of medical use conditions and sanitation requirements and the like.

For a variety of reasons it may be necessary to provide catheters with side holes or apertures that extend transverse to the catheter's lumens. For example, in diagnostic catheters, a diagnostic contrast medium is injected through the tip and side holes to obtain a good cloud distribution. A well distributed cloud is particularly advantageous when a catheter pigtail is used to flush the heart chambers with a contrast medium. In other cases holes may be used to create a port for guidewires. In addition, holes are employed in filter-wires to allow blood cells to pass through the filter.

Conventional techniques for producing side holes in catheters include punching or drilling. One problem with such techniques is that the resulting holes generally have sharp edges where they meet the outer surface of the catheter. Sharp edges are undesirable because they may scrape or otherwise damage the vessel wall as the catheter is inserted into position. More generally, holes or other features with a wide variety of different shapes and orientations with respect to the catheter can be difficult to produce by conventional techniques.

In recent years lasers have been shown to be a valuable means for performing high-precision micromachining because of their directionality, coherence, high intensity and high photon energy. In particular, lasers have been employed to produce voids or thru-holes by a process of ablation. In contrast to punching or drilling techniques, the voids or thru-holes formed by ablation may be circular or non-circular in shape. In ablation processes lasers, often operating at ultraviolet wavelengths, provide photons with sufficient energy to excite the electrons that form the molecular bonds of certain workpiece materials such as polymeric materials. Sufficient excitation of the bonding electrons with a beam results in the localized disassociation of the material with little or no heating of the workpiece.

Accordingly, it would be desirable to provide an improved method and apparatus for ablating material from a workpiece so that a variety of differently configured features may be formed.

SUMMARY OF THE INVENTION

In accordance with the present invention, a method and apparatus is provided for removing material from an outer surface of a workpiece such as a medical device. The method begins by generating a laser beam having an intensity profile and directing the laser beam onto the outer surface of the workpiece. After the laser beam is generated, its intensity profile is adjusted by diffraction so that material can be removed from the workpiece by ablation in a prescribed manner.

In accordance with one aspect of the invention, the laser beam is a pulsed laser beam.

In accordance with another aspect of the invention, the workpiece has an outer surface that is at least in part nonplanar and onto which the pulsed laser beam impinges. The intensity profile of the laser beam is adjusted so that material can be removed from over a portion of the nonplanar outer surface to a common depth in the same number of laser pulses.

In accordance with another aspect of the invention, a method and apparatus is provided for ablating material from a workpiece to form a feature therein. The feature has a given depth profile across its width that extends in at least one lateral direction. The method begins by generating a laser beam having an intensity profile across its width and directing the laser beam onto the workpiece in a direction perpendicular to a lateral direction. After the laser beam is generated, its intensity profile is adjusted so that the given depth profile of the feature across its entire width in the lateral direction can be formed by ablation in a prescribed manner.

In accordance with another aspect of the invention, the given depth profile is non-constant across the width of the feature.

In accordance with another aspect of the invention, the given depth profile extends in at least two lateral directions.

In accordance with another aspect of the invention, the intensity profile of the laser beam is adjusted so that the given depth profile in any lateral direction can be substantially ablated in the same number of laser pulses.

In accordance with another aspect of the invention, the workpiece is a tubular component and the feature is at least one void extending through one wall of the tubular component.

In accordance with another aspect of the invention, the void comprises a plurality of voids extending through the wall of the tubular component.

In accordance with another aspect of the invention, the void has a circular cross-section.

In accordance with another aspect of the invention the workpiece is a polymeric workpiece.

In accordance with another aspect of the invention, the workpiece is a catheter component.

In accordance with another aspect of the invention, the void is tapered as it meets an outer surface of the wall of the tubular component.

In accordance with another aspect of the invention, the void has a longitudinal axis that forms an acute angle with a radially extending axis through the tubular component.

In accordance with another aspect of the invention, the prescribed manner in which the feature can be formed comprises forming the feature across its entire width in the same number of laser pulses.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows:

FIG. 1(a) is a cross-section through a tube-shaped workpiece in which a void or thru-hole is to be ablated and FIG. 1(b) is a graph that shows on the vertical axis the thickness of the workpiece wall that needs to be removed to ablate the void as a function of the distance across the diameter of the hole;

FIG. 2 is schematic diagram of a laser ablation system constructed in accordance with the present invention;

FIG. 3(a) is a cross-section through a tube-shaped workpiece similar to that depicted in FIG. 1, but with a differently configured void that is to be ablated and FIG. 3(b) is a graph that shows on the vertical axis the thickness of the workpiece wall that needs to be removed to ablate the void as a function of the distance across the diameter of the void;

FIG. 4(a) is a cross-section through a tube-shaped workpiece similar to that depicted in FIG. 1, but with yet another differently configured void that is to be ablated and FIG. 4(b) is a graph that shows on the vertical axis the thickness of the workpiece wall that needs to be removed to ablate the void as a function of the distance across the diameter of the void in a direction perpendicular to the direction in which the laser beam propagates.

DETAILED DESCRIPTION

Figure 5:
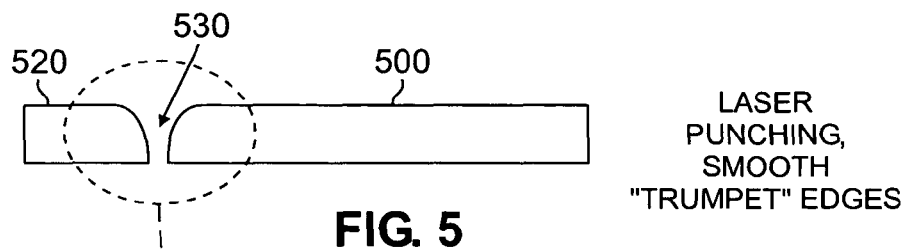
FIG. 5-7 shows examples of additional features that can be formed in various workpieces by the present invention.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to methods and apparatuses for effectively ablating material in polymeric materials to from voids, thru-holes or other features, and in particular for ablating material in medical devices, such as catheters. Additionally an aspect of the present invention may be used to ablate non-polymeric materials such as metals, for example, stainless steel as well as other non-polymeric material, including without limitation, ceramics and glasses. In particular, the present invention can advantageously provide the ability to ablate tubular components of polymeric materials that are usable for making up components of medical catheters of all types. Such catheters are often constructed from a lubricous material such as a high-density polyethylene or similar material to minimize the friction between the guide wire and the surface of the catheter lumen. Polymeric materials are known primarily for these uses. For, example, balloons are frequently formed from polyethylene terephthalate (PET) as well as nylon, co-polymers, block polymers, polymer blends, etc.

Laser ablation of polymeric materials is often performed with lasers that generate pulsed beams at wavelengths of 248 nm, 193 nm, or even shorter wavelengths. The advantages of using shorter wavelengths and shorter pulses include a reduction in excess heat that could damage the workpiece. One problem, however, that arises when ablating a thru-hole or void in a workpiece that has a curved surface such as a catheter, stent or guidewire, which have generally cylindrical shapes, is that due to the curved surface, the depth through the workpiece that needs to be ablated varies across the diameter of the void. This can be seen with reference to FIG. 1(a), which shows a cross-section through a tube-shaped workpiece 100. The workpiece includes a wall 110 through which a void 120 is to ablated or otherwise drilled. FIG. 1(b) is a graph that shows on the vertical axis the thickness of the wall that needs to be removed to drill the void and the horizontal axis shows the distance across the diameter of the void, with the origin being at the rightmost edge of the void denoted by reference numeral 122. As FIG. 1(b) shows, the thickness of the wall is greatest at its edges 122 and 126 and is thinnest at the void center 124. This variation in depth presents a problem because during ablation material from the center of the void will be removed before the material from the edges of the voids, assuming that material is removed at about the same rate across the diameter of the void. As a consequence, once the laser beam has penetrated through the center of the void it may damage the opposing wall of the workpiece while the remaining material at the periphery of the void is still being removed. That is, by the time the complete void is ablated, the opposite wall will have been adversely impacted. As discussed below, the present invention addresses this problem.

In a laser ablation processes the ablation rate is conveniently measured in terms of the depth that is ablated in the workpiece per laser pulse. The ablation rate generally increases with energy fluence and varies from material to material. As previously mentioned, the amount of material that needs to be removed to ablate a complete void through one wall of a tubular structure increases with the radial distance from the center of the void. Ideally, it should be possible to ablate the entire void with the same number of laser pulses. Unfortunately, because of the variations in depth that need to be ablated, more pulses are generally needed to ablate the periphery of the void in comparison to the center of the void, thereby possibly causing damage to the opposing wall.

The present inventors have recognized that a void in a workpiece that has a depth that differs at different points across its diameter can be ablated using the same number of laser pulses across its entire diameter if the intensity profile of each pulse can be controlled so that the intensity is a maximum where the depth of the void is greatest and is a minimum where the void depth is a minimum. For example, if the workpiece is a tubular component such as a catheter, the intensity profile of each pulse can be controlled so that the intensity is a maximum where the pulse impinges on the void edges and is a minimum at the void center (see FIG. 1(b)). That is, the energy density impinging on the workpiece is redistributed to simultaneously form the entire feature even if the feature extends into the workpiece by amounts that vary across the feature.

In accordance with the present invention, the intensity profile of the laser beam used to ablate a feature in a workpiece is adjustably controlled by a beam shaping element. Such beam shaping elements take an input laser beam and generate an output laser beam that is the Fourier transform of the optical field of the input beam and a phase function. In principle a beam shaper can take an input laser beam having any particular intensity profile and produce an output laser beam having any other intensity profile that is desired. The beam shaping element may be used to control the beam intensity of the laser that is applied to a workpiece so that in forming a void with different depths across its diameter the laser beam penetrates through each point along the diameter of the void at the same time (i.e. with the same number of pulses). That is, the present invention uses a beam shaper to produce a laser beam with an intensity profile that is appropriately tailored to the particular configuration of the both the workpiece and the void to be ablated.

One example of a beam shaping element that may be employed in the present invention is a holographic optical element (HOE). An HOE is an optical component used to modify light rays by diffraction, and is produced by recording an interference pattern of two laser beams and can be used in place of lenses or prisms where diffraction rather than refraction is desired. One advantage arising from the use of an HOE as a beam shaping element is that an HOE is dynamically adjustable. That is, the HOE can dynamically adjust the intensity profile of the laser beam so that the distribution in energy density delivered to the workpiece can be varied in time. Such an HOE is also employed in copending U.S. application Ser. No. 10/883,868. Of course, the present invention is not limited to HOEs but rather encompasses other beam shaping elements that can take an input laser beam having any particular intensity profile and produce an output laser beam having any other intensity profile that is desired.

Another exemplary beam shaping element that may be employed in the present invention is a diffractive optical element (DOE). DOEs have zones of refraction, phase shift, or amplitude modulation with a scale that allows for the directional control of diffraction effects. Diffracting optical elements are made using computation to describe the zones of diffraction, and these zones are then produced in a suitable substrate surface by means of diamond turning or by lithographic processes common to semiconductor manufacturing or injection molding.

It should be noted that unlike many other optical elements, the beam shaping elements employed in the present invention such as the aforementioned HOEs and DOEs modify light rays on the basis of diffraction. In contrast, optical elements such as lenses modify light rays on the basis of refraction.

In FIG. 2, a schematic illustration of one embodiment of a laser ablation system 240 for ablating polymeric materials in accordance with the present invention is shown. In particular, the laser ablation system 240 is particularly designed for ablating voids in catheter components formed from polymeric or other materials. However, the laser ablation system 240 may additionally be utilized to ablate voids in non-polymeric materials as well.

In ablation system 240 according to the present invention, a laser 212 is utilized, which will be described in greater detail below, the purpose of which is to cause sufficient excitation of bonding electrons within the workpiece to cause localized disassociation of the workpiece material. In this process, the laser 212 transmits a laser beam 214 in the direction generally indicated by arrow 216. Preferably the laser is an excimer laser, in which case the wavelength of the laser beam 214 is about 248 nm. It is understood that any laser may be used such that the functional aspects of the present invention are accomplished. The laser may generate a cw beam or a pulsed beam. For example, ultrashort (e.g., femtosecond) lasers may be employed that operate at visible or infrared wavelengths. For example, suitable lasers include those currently available from Spectra Physics™ that generate a sub 500 femtosecond pulse train at a wavelength of 1,050 nm with an average power of up to about 4 watts, as well as a laser operating at 525 nm at powers as high as about 1.5 watts. It is contemplated that the laser beam 214 may also be directed through optical devices such as lenses and collimators (not shown) for managing the laser beam in accordance with the present invention.

A beam shaping element 225 such as an HOE or DOE is located on the optical path between the laser 212 and a workpiece 200. In this way the beam shaping element 225 receives the laser beam 214 and transforms it so that its intensity profile is better optimized to ablate the desired feature in workpiece 200. In the embodiment of the invention shown in FIG. 2, the laser beam 214 impinges on the workpiece 200 at a substantially normal angle of incidence in order to efficiently utilize the laser beam power. It is understood, however, that the laser beam 214 may impinge on the workpiece 200 at any angle provided that sufficient energy is created for a specific ablation application taking into account the materials involved and the type of laser used.

The configuration of the beam-shaping element 225 needed to achieve a laser intensity profile for forming a particular feature by ablation such as a void, bore, channel or depression in a workpiece can be readily calculated in a known manner given values for two parameters. One of the parameters is the ablation depth as a function of the energy fluence for the particular workpiece material to be ablated. The other parameter is the thickness of the material that needs to be removed across the ablated feature. Given the values for these parameters, the configuration of the beam shaping element 225 can be determined using well-known numerical models such as those described, for example, in "Diffractive Optical Elements for Biomedical Application," M. Golub and I. Grossinger, SPIE Vol. 3199 p. 220.

While the embodiment of the invention shown in FIG. 2 is illustrated as ablating material to form a void that extends completely through one wall of a polymetric tube, the ablation system may also be employed to ablate material to form voids or other features that have any desired shape (e.g., rings, polygons, and irregular shaped features) and any desired orientation with respect to the workpiece. For example, as shown in FIG. 3($a$), a void 330 having a flat bottom can be ablated in tubular workpiece 300. FIG. 3($b$) shows the amount of material that needs to be removed across the diameter of the void 330. In this case the greatest amount of material needs to be removed from the center of the void and the least amount of material needs to be removed from the edges of the void. Accordingly, the beam shaping element should be configured so that laser beam has an intensity profile with a maximum intensity impinging on the center location where the void is to be formed and a minimum intensity impinging on the edges of the location where the void is to be formed.

FIG. 4 shows another feature that may be formed by ablation in the wall of a tubular workpiece. In this case the feature is an arc segment 430 of the workpiece wall. Similar to FIG. 3($b$), the graph in FIG. 4($b$) shows the amount of material that needs to be removed across the arc segment 430. Since the amount of material that needs to be removed from the wall varies in a more complex manner than in FIG. 3($b$), the intensity profile of the laser beam that is required is correspondingly more complex as well.

FIG. 5 shows yet another feature that may be produced in accordance with the present invention. The feature defines a void 530 has a tapered opening adjacent the outerwall 520 of the workpiece 500. If the workpiece 500 is a catheter, such a void may be advantageously employed to prevent damage to vessel walls that may arise from the sharp edge of a straight void as the catheter is inserted into position.

Figure 6:
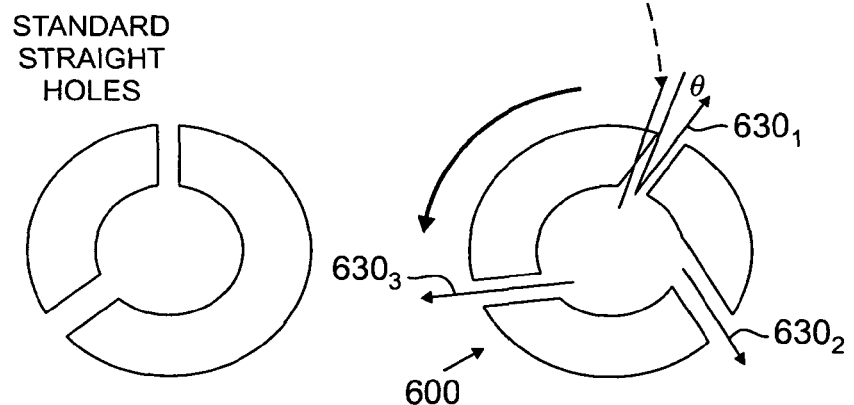

FIG. 6 shows a cross-section through a catheter 600 in which multiples voids $630_1$, $630_2$, and $630_3$ are formed in accordance with the present invention. The longitudinal axes of the voids $630_1$, $630_2$, and $630_3$ are offset by some angle θ from the radial axis extending through the catheter. If the voids $630_1$, $630_2$, and $630_3$ are used to inject a contrast medium from the catheter, the force exerted by the contrast fluid will cause the catheter to rotate about its longitudinal axis, which will in turn cause the fluid to be better distributed.

Figure 7:
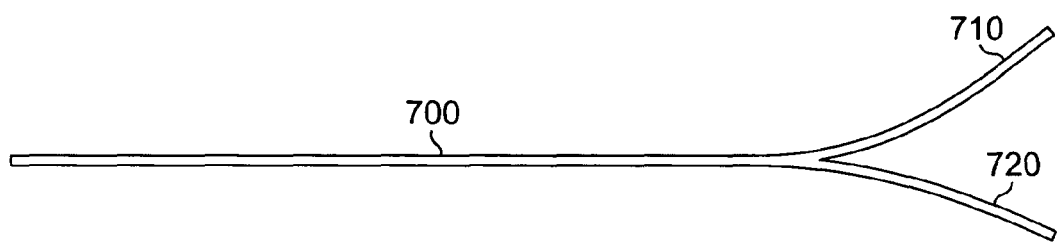

FIG. 7 shows yet another application of the present invention in which the workpiece is a dual lumen tube 700. In this example ablation is accomplished with a laser beam having a relatively complex intensity profile to split the dual lumen 700 into two individual lumens 710 and 720.

In some embodiments of the invention the feature that is to be formed in the workpiece is a pattern that extends over the workpiece. For example, instead of ablating material to form a single void in the workpiece, the intensity profile of the laser beam may be adjusted so that the energy density impinging on the workpiece ablates multiple voids simultaneously. Moreover, each void may be the same or different in size, depth and overall configuration.

If the beam shaping element that is employed in the present invention is a dynamically adjustable element, such as an HOE, for example, then the intensity profile of the laser beam can be adjusted during the ablation process in between two pulses. This can be advantageous in a variety of circumstances. For example, if the workpiece is a non-homogeneous structure that is formed, for example, from two or more different materials, the laser pulses may be applied in two distinct series. After the first series of pulses is applied, the results can be examined and the intensity profile adjusted as necessary to achieve with the second series of pulses the desired depth profile across the feature being ablated.

The present invention is not limited to the above described preferred method and apparatus. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

The invention claimed is:

1. A method for ablating material from a medical device to form a feature therein, the feature having a given depth profile across its width that extends in at least one lateral direction, the method comprising the steps of:
generating a laser beam having an intensity profile across its width;
adjusting the intensity profile by diffraction of the laser beam so that the given depth profile of the feature across its entire width in the lateral direction can be simultaneously formed by ablation in a prescribed manner; and
after adjustment, directing the laser beam onto the medical device in a direction perpendicular to a lateral direction to form the feature so that it has the given depth profile when formed.

2. The method of claim 1 wherein the given depth profile is non-constant across the width of the feature.

3. The method of claim 1 wherein the given depth profile extends in at least two lateral directions.

4. The method of claim 3 wherein the intensity profile of the laser beam is adjusted so that the given depth profile in any lateral direction can be substantially ablated in the same number of laser pulses.

5. The method of claim 1 wherein the medical device is a tubular component and the feature is at least one void extending through one wall of the tubular component.

6. The method of claim 5 wherein the void comprises a plurality of voids extending through the wall of the tubular component.

7. The method of claim 6 wherein the medical device is a catheter component.

8. The method of claim 5 wherein the void has a circular cross-section.

9. The method of claim 5 wherein the void is tapered as it meets an outer surface of the wall of the tubular component.

10. The method of claim 5 wherein the void has a longitudinal axis that forms an acute angle with a radially extending axis through the tubular component.

11. The method of claim 1 wherein the laser beam is a pulsed laser beam.

12. The method of claim 11 wherein the prescribed manner in which the feature can be formed comprises forming the feature across its entire width in the same number of laser pulses.

13. The method of claim 1 wherein the medical device comprises polymeric material.

14. The method of claim 1 wherein the medical device is a catheter component.

15. The method of claim 1 wherein the laser beam is a cw laser beam.

16. An apparatus for ablating material from a medical device to form a feature therein, the feature having a given depth profile across its width that extends in at least one lateral direction, the apparatus comprising:
a support for supporting and positioning the medical device;
a laser operatively positioned for directing a laser beam having an intensity profile across its width toward a location of the feature to be formed in a direction perpendicular to a lateral direction;
a beam shaping element operatively positioned for receiving the laser beam, the beam shaping element being configured to adjust the intensity profile of the laser beam by diffraction so that the given depth profile of the feature is simultaneously formed by ablation across its entire width in the lateral direction in a prescribed manner.

17. The apparatus of claim 16 wherein the medical device is a tubular component and the feature is at least one void extending through one wall of the tubular component.

18. The apparatus of claim 17 wherein the void comprises a plurality of voids extending through the wall of the tubular component.

19. The apparatus of claim 17 wherein the medical device is a catheter component.

20. The apparatus of claim 17 wherein the void is tapered as it meets an outer surface of the wall of the tubular component.

21. The apparatus of claim 17 wherein the void has a longitudinal axis that forms an acute angle with a radially extending axis through the tubular component.

22. The apparatus of claim 16 wherein the given depth profile extends in two lateral directions.

23. The apparatus of claim 22 wherein the beam shaping element is configured so that the intensity profile of the laser beam is adjusted so that the given depth profile can be substantially ablated in the same number of laser pulses.

24. The apparatus of claim 16 wherein the laser generates a pulsed laser beam.

25. The apparatus of claim 24 wherein the prescribed manner in which the feature can be formed comprises forming the feature across its entire width in the same number of laser pulses.

26. The apparatus of claim 16 wherein the given depth profile is non-constant across the width of the feature.

27. The apparatus of claim 16 wherein the medical device comprises a polymeric medical device.

28. The apparatus of claim 16 wherein the medical device is a catheter component.

29. The apparatus of claim 16 wherein the beam shaping element is a dynamically adjustable beam shaping element.

30. The apparatus of claim 16 wherein the beam shaping element is an HOE.

31. The apparatus of claim 16 wherein the beam shaping element is a DOE.

32. The apparatus of claim 16 wherein the laser generates a cw laser beam.

33. A method for removing material from an outer surface of a medical device, the method comprising the steps of:

generating a laser beam having an intensity profile;

adjusting the intensity profile by diffraction of the laser beam so that the given depth profile of the feature across its entire width can be simultaneously formed by ablation in a prescribed manner after adjustment, directing the laser beam onto the medical to form the feature so that it has the given depth profile when formed.

34. The method of claim 33 wherein the laser beam is a pulsed laser beam.

35. The method of claim 34 wherein the medical device has an outer surface that is at least in part non-planar and onto which the pulsed laser beam impinges, the intensity profile of the laser beam being adjusted so that material can be removed from over a portion of the nonplanar outer surface to a common depth in the same number of laser pulses.

36. The method of claim 33 wherein the laser generates a pulsed laser beam.

* * * * *